(12) United States Patent
Wallinder et al.

(10) Patent No.: US 6,240,289 B1
(45) Date of Patent: May 29, 2001

(54) METHOD RELATING TO A TELECOMMUNICATION SYSTEM

(75) Inventors: Sören Wallinder, Haninge (SE); Paul T. Fjuk, Billingstad (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/865,127

(22) Filed: May 29, 1997

(30) Foreign Application Priority Data

May 31, 1996 (SE) .................................................... 9602190

(51) Int. Cl.⁷ .............................. H04Q 7/20; H04M 3/46
(52) U.S. Cl. ...................... 455/435; 455/433; 455/461; 379/211
(58) Field of Search ..................... 455/435, 432, 455/411, 433, 461; 379/211, 88.16, 439; 370/426

(56) References Cited

U.S. PATENT DOCUMENTS

| | | | | |
|---|---|---|---|---|
| 4,850,005 | * | 7/1989 | Hashimoto ........................... | 379/439 |
| 5,239,586 | * | 8/1993 | Marui ................... | 704/270 |
| 5,457,736 | * | 10/1995 | Cain et al. ........................... | 455/439 |
| 5,574,773 | * | 11/1996 | Grob et al. ............................. | 379/59 |
| 5,581,611 | * | 12/1996 | Yunoki ................. | 379/211 |
| 5,812,948 | * | 9/1998 | Hjern et al. .......................... | 455/435 |

FOREIGN PATENT DOCUMENTS 2 263 845   8/1993  (GB).

WO 95/20864 * 8/1995 (SE) .............................. H04Q/7/32

OTHER PUBLICATIONS

J. Sundborg, "Universal Personal Telecommunication (UPT)—Concept and Standardization," Ericsson Review, No. 4, pp. 140–155 (1993).

S. Wallinder, "Implementation of UPT—Universal Personal Telecommunication," Ericsson Review, No. 1, pp. 40–48 (1994).

* cited by examiner

*Primary Examiner*—Lee Nguyen
*Assistant Examiner*—Simon Nguyen
(74) *Attorney, Agent, or Firm*—Burns, Doane, Swecker & Mathis, L.L.P.

(57) ABSTRACT

An automatic verification in a personal number system, in particular a Universal Personal Telecommunication (UPT) system. A vocal verification is automatically issued after registration of a new registration number and the new registration number can be validated as a true registration number. Also, a test connection of the new registration number can be performed by means of setting up of a connection from the Service Control Point to the new registration number and letting a ring signal sound and then automatically disconnect the connection.

The provision of the vocal verification of the new registration number, the validation of the new registration number, and the setting up of a test connection significantly reduces the risk. (FIG. 1)

16 Claims, 2 Drawing Sheets

METHOD RELATING TO A TELECOMMUNICATION SYSTEM

TECHNICAL FIELD

The present invention relates to a method to be used in a Personal Number system, in particular a Universal Personal Telecommunication (UPT) system, and to a system in which the method is used.

BACKGROUND

Universal Personal Telecommunication, is a mobility area that has been defined in standardisation processes since 1989/90.

Universal Personal Telecommunication (UPT) offers a combination of supportive telecommunication services for UPT users. The UPT user has a personal telephone number that the users can keep, throughout his lifetime. If a caller wishes to call a UPT user, instead of having to call a number of places where the caller believes the UPT user might be, the caller can reach the UPT user in a way that the UPT user decides.

This means that instead of having to dial a lot of numbers from a business-card, the caller can dial a universal number to reach the UPT user, a person or a role with UPT number. In the future, it will be possible to use this number to forward all types of traffic, such as voice, facsimile, data and video.

The UPT user can use any terminal to make or receive calls regardless of which telecommunication network or terminal is at his disposal for the moment, for example the Public Switched Telephone Network (PSTN), a business network or a cellular network.

Outgoing calls are charged to the UPT number. Each user can access the available services over a normal Dual Tone Multi Frequency (DTMF) telephone or a DTMF transmitter. Users of UPT are supported by a number of functions that make it possible to store messages, and re-route incoming traffic to various alternative numbers according to the users personal UPT timetable.

In UPT and other personal number type services, the users must update their service profiles with the new locations where they from now on want to receive incoming calls. The new registration number can e.g. be retrieved from the user entered DTMF input or from the call data, i.e. the A-Number or Calling Line Identity (CLI), in these cases the UPT user is relying on that the incoming calls now will be set-up to the registration location. In many situations, this will not be the case:

The user might have entered a wrong number, the network has included a number that can not be used for incoming calls as A-Number e.g. from a public exchange, etc.

The UPT system of today is described in Jonas Sundborg "Universal Personal Telecommunication (UPT)- Concept and Standardisation", Ericsson Review No. 4, 1993, and S ören Wallinder "Implementation of UPT- Universal Personal Telecommunication", Ericsson Review No. 1, 1994.

In the published patent application GB 2 263 845 A, a method of controlling UPT services is described. The method comprises the provision of a subscriber announcement when a UPT subscriber changes his/her Directory Number (DN) in order to notify the subscriber when the UPT number has been changed.

SUMMARY OF THE INVENTION

It is an object of the present invention to overcome the problems encountered in registration of a new location for the UPT user or a user of another Personal Number type service and in particular to ensure that it is possible to reach the subscriber at the new location.

This object is obtained by adding, during the registration procedure, a registration verification function. The verification function can comprise:

1) a verification announcement comprising announcement of the new registration number to the user, and/or
2) a verification call back comprising a possibility for the user to during the verification announcement entering of a character, e.g. (*), and then go on-hook. The service profile will then set-up a verification call to the user, using the newly entered registration number as the destination number for the call.

The user will then receive an incoming call as a verification of the validity of the registration. The user can now be sure that all incoming calls actually will be set-up to where he/she is located at the moment. Providing this functionality it will be easier to sell the product and make it more useful for end-users.

BRIEF DESCRIPTION OF THE DRAWINGS

The present invention will be better understood from the following detailed description referring to the accompanying drawings, in which.

DETAILED DESCRIPTION

Figure 1:
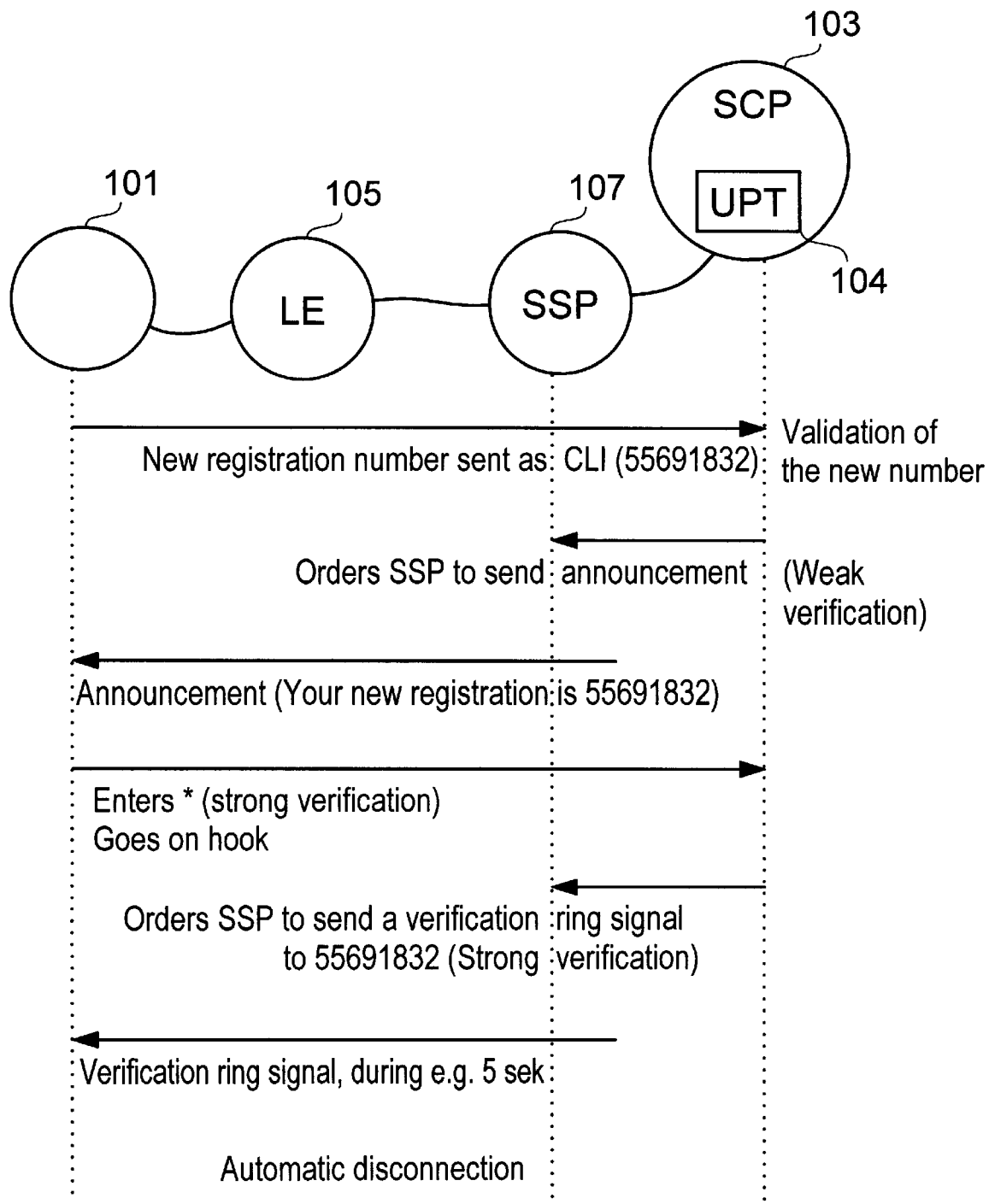
FIG. 1 is a diagram showing transactions carried out during an automatic verification procedure.

The flow chart in FIG. 1 shows an implementation example. FIG. 1 shows an end-user 101 connecting to a Service Control Point (SCP) 103, which is providing a UPT service by means of UPT module 104 contained therein. The SCP 103 contains the service profile and the services associated with each user. The connection is established via a Local Exchange (LE) 105 and a Service Switching Point (SSP) 107. The new registration number is sent to the SCP 103 via the Calling Line Identity (CLI), i.e. the number associated with the telephone etc. at the new location at which the subscriber can be reached is provided from some module comprised in LE 105 or SSP 107. If the CLI cannot be transferred automatically all the way to the SCP 103, an announcement is sent to the UPT subscriber 101 telling that he/she must dial the new registration number manually.

The SCP 103 will then check if the registration number is valid or invalid. If the number is invalid, the UPT subscriber 101 is informed via an announcement. If the number is valid, a verification procedure is initiated.

The verification procedure can consist of two parts, Weak Verification and Strong Verification. The weak verification will always be done, whereas the strong verification is optional.

The weak verification is carried out by an announcement initiated from the SCP 103 telling the subscriber his/her new registration number, e.g.: 'Your new registration is fifty-five sixty-nine eighteen thirty- two'.

A strong verification will be done automatically, if the UPT subscriber has specified this in his/her subscriber profile or the UPT subscriber can decide each time if he/she wants a strong verification by entering a character, such as (*), during the weak verification announcement and then go on-hook.

The strong verification consists of a ring signal to the new registration number having a duration of e.g. 5 sec. The call will then always automatically be disconnected after the ring signal.

Figure 2:
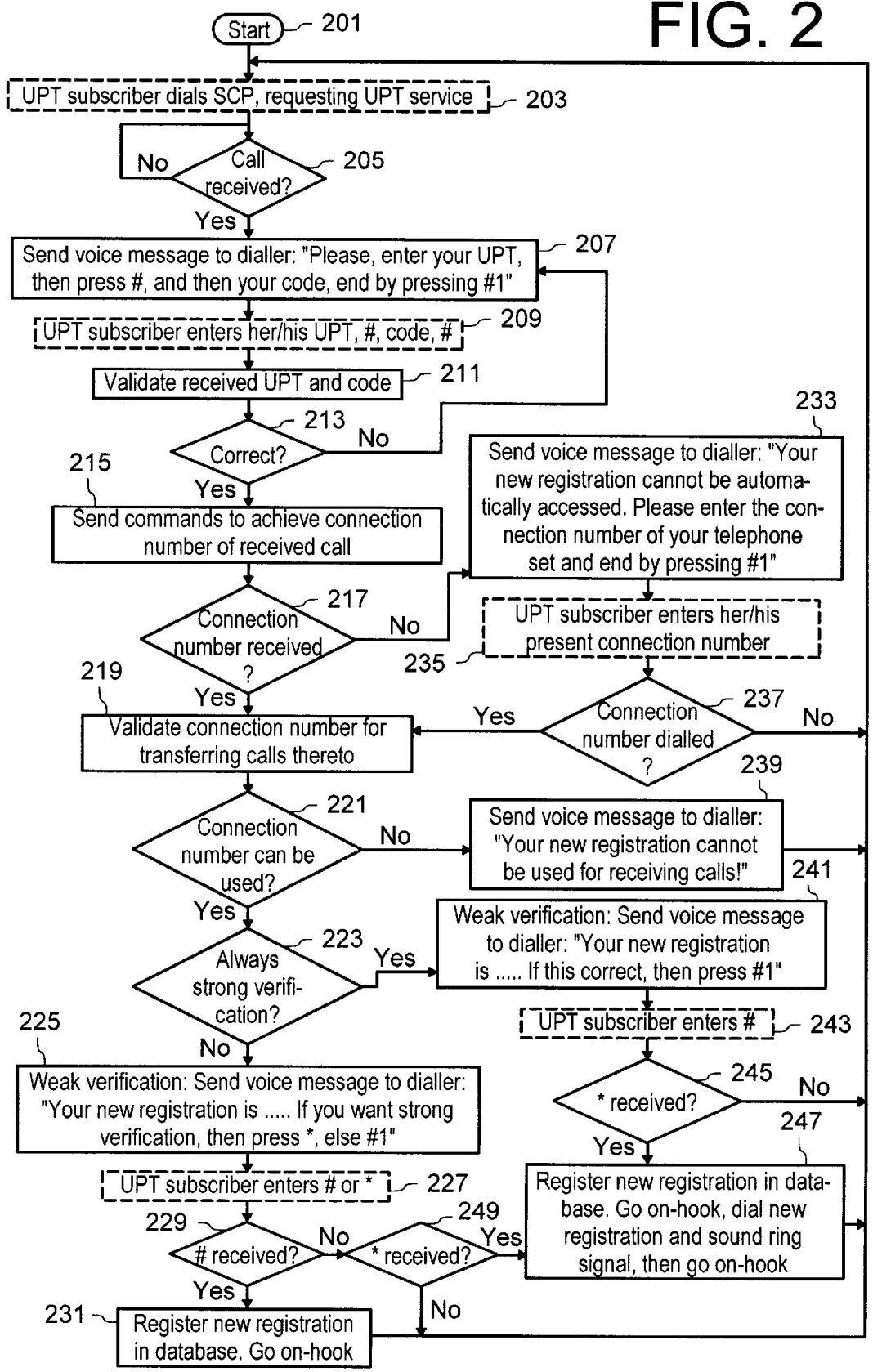
FIG. 2 is a flow diagram of the procedural steps executed by a UPT module.

The procedural steps during a call for changing registration are illustrated in the flow diagram of FIG. 2, the flow starting in a start block 201. A UPT subscriber is assumed to dial the SCP in a block 203 and in particular the UPT module thereof. The module monitors calls as illustrated in a block 205 and proceeds to a block 207 when a call has been received. Here, the UPT module sends a voice message to the dialler for obtaining the UPT of the caller, for example: "Please enter your UPT, then press '"', then your personal code and end by pressing '#'!".

The dialling person is assumed to enter these numbers in a block 209 and these are validated in a block 211, by suitable checking against some database, the personal code being used for security reasons. The result of the validation is decided in a block 213. If the validation gave a negative answer, the procedure continues to the block 607 which is repeated over again.

However, if the validation gave a positive answer, that is that the received UPT and code are correct and belong to each other, a block 215 is executed where suitable commands or questions are sent to the SSP or LE for finding the connection number of the received call. Whether a connection number has been received is questioned in a block 217 and if the answer is yes, the received connection number is validated in a block 219 whether it is possible to transfer incoming calls to this connection.

The outcome of this validation is decided in a block 221 and if the number can be used it is decided, by looking into the user profile, if the person owning this UPT always wants strong verification to be made. If it is not the case, a block 225 is executed where the weak verification is made, that is a voice message is issued to the dialling person, for example: "Your new registration is . . . If you want strong verification, then press '*', else press '#'!".

Thereupon the user is assumed to dial "#" or "*" as illustrated in a block 227. Then it is tested in a block 229 whether a "#" has been received. In the case where it has been received, the connection number is registered as the new registration in the database provided therefor. Then the subscriber line is place in on-hook position and the arrival of a new call is awaited in the block 605.

In the case where it was decided in the block 217 that no connection number could be received from the switching points or other system services, a block 233 is executed. There a voice message is sent informing thereof, such as: "The connection number of your present location cannot be automatically found. Please, enter the connection number of your telephone set, to be used as your registration, and end by pressing '#'".

The user is assumed to enter the connection number as illustrated in a block 235 and then it is asked in a block 237 whether any connection has been dialled. If it is the case, the procedure continues to the block 219 for validating this number for incoming calls.

In the case where it was decided in the block 221 that the connection number cannot be used for receiving calls, a block 239 is executed. There, some voice message is sent to the dialling person, e.g.: "The connection number of your present telephone set cannot be used for incoming calls and thus cannot be used as your new registration!". Then the procedure is finished and the control is transferred to the block 605 for awaiting a new UPT update request.

In the case where it is found in the block 223 that the UPT subscriber always desires strong verification of a new registration, a block 241 is executed where the weak verification is made. Thus some message like: "Your new registration is the connection number of the telephone set used for this call. If this what you want, then press "#"!". Then the user is assumed to dial "#" as illustrated in a block 243. Then it is determined in a block 245 whether a "#" has been received. In the case where it has not been received, the procedure considers that no new registration number will be recorded and thus the control proceeds to the block 605 checking for new UPT update calls. If it determined in the block 245 that the character "#" has been received, a block 247 is executed where the connection number is registered as the new registration in the registration database. Then the subscriber line is placed in on-hook position and then the strong verification is executed. Thus a call is made to the connection number corresponding to the new registration and a ring signal is allowed to sound for a suitable time period. Then again, the line is placed in on-hook position. The strong verification is then finished and the arrival of a new call is awaited in the block 605.

If it was decided in the block 229 that the character "#" has not been received, it is determined in a block 249 whether a "*" has been received. If it is decided to be true the block 247 is performed as above, executing the strong verification step. Otherwise the new registration number is deemed not to be used and the control is transferred to the new call await block.

What is claimed is:

1. A personal number telecommunication system comprising:
   means for requesting a registration of a personal access number for a personal electronic device with a universal access system;
   means for validating during registration that the personal access number can be registered with the universal access system;
   means for automatically verifying during registration that a validated personal access number is to be registered using a weak confirmation, whereby the validated personal access number is sent in a message from the universal access system to the personal electronic device; and
   means for registering the personal access number in response to an acknowledgment to the weak confirmation sent from the personal electronic device to the universal access system, wherein after registration, a universal access number can be used to access the personal electronic device.

2. The system of claim 1, further comprising means for verifying during registration that a validated personal access number has been successfully registered using a strong confirmation, whereby the universal access system uses the universal access number to establish a connection with the personal electronic device to issue an audible confirmation.

3. The system of claim 2, wherein a strong confirmation is initiated by a request sent from the personal electronic device in response to the weak confirmation.

4. The system of claim 2, wherein the request comprises information corresponding to the activation of a specific key function on the personal electronic device.

5. The system of claim 2, wherein a strong confirmation is automatically initiated by the universal access system using a system profile associated with the personal electronic device and accessible by the universal access system, the system profile indicating that a strong confirmation is always to occur upon successful registration of a valid personal access number.

6. The system of claim 2, wherein the audible confirmation is a ring signal of a fixed duration, after which the connection between the universal access system and the personal electronic device is released.

7. The system of claim 1, wherein the acknowledgment comprises information corresponding to the activation of a specific key function on the personal electronic device.

8. The system of claim 1, wherein the universal access system is a Universal Personal Telecommunication (UPT) system.

9. A method for registering a personal number in a personal number telecommunication system, the method comprising the steps of:
   requesting a registration of a personal access number for a personal electronic device with a universal access system;
   validating during registration that the personal access number can be registered with the universal access system;
   automatically verifying during registration that a validated personal access number is to be registered using a weak confirmation, whereby the validated personal access number is sent in a message from the universal access system to the personal electronic device; and
   registering the personal access number in response to an acknowledgment to the weak confirmation sent from the personal electronic device to the universal access system, wherein after registration, a universal access number can be used to access the personal electronic device.

10. The method of claim 9, further comprising the step of verifying during registration that a validated personal access number has been successfully registered using a strong confirmation, whereby the universal access system uses the universal access number to establish a connection with the personal electronic device to issue an audible confirmation.

11. The method of claim 10, wherein a strong confirmation is initiated by a request sent from the personal electronic device in response to the weak confirmation.

12. The method of claim 10, wherein the request comprises information corresponding to the activation of a specific key function on the personal electronic device.

13. The method of claim 10, wherein a strong confirmation is automatically initiated by the universal access system using a system profile associated with the personal electronic device and accessible by the universal access system, the system profile indicating that a strong confirmation is always to occur upon successful registration of a valid personal access number.

14. The method of claim 10, wherein the audible confirmation is a ring signal of a fixed duration, after which the connection between the universal access system and the personal electronic device is released.

15. The method of claim 9, wherein the acknowledgment comprises information corresponding to the activation of a specific key function on the personal electronic device.

16. The method of claim 9, wherein the universal access system is a Universal Personal Telecommunication (UPT) system.

* * * * *